United States Patent [19]
Hatch

[11] Patent Number: 6,051,635
[45] Date of Patent: Apr. 18, 2000

[54] DOWELS MADE FROM THERMOSETTING RESINS AND PROCESS OF MAKING SAME

[76] Inventor: J. Mel Hatch, 4850 S. Hidden Cove Cir., Murray, Utah 84123

[21] Appl. No.: 08/700,085

[22] Filed: Aug. 20, 1996

[51] Int. Cl.$^7$ .............................. C08J 9/24; F16B 13/00
[52] U.S. Cl. ................................ 524/14; 524/13; 524/6; 524/15; 524/908; 403/294
[58] Field of Search .................................... 524/14, 13, 6, 524/15, 908; 403/294

[56] References Cited

U.S. PATENT DOCUMENTS

| | | | |
|---|---|---|---|
| 3,965,051 | 6/1976 | Markusch et al. | 524/6 |
| 4,770,834 | 9/1988 | Nakasone et al. | 264/127 |
| 4,857,252 | 8/1989 | Melchior et al. | 524/14 |
| 5,037,234 | 8/1991 | De Jong | 403/268 |
| 5,346,930 | 9/1994 | Maine et al. | 524/14 |
| 5,783,125 | 7/1998 | Bastone et al. | 264/45.3 |

*Primary Examiner*—James J. Seidleck
*Assistant Examiner*—Olga Asinovsky
*Attorney, Agent, or Firm*—Trask, Britt & Rossa

[57] ABSTRACT

A dowel for use in the woodworking industry to secure two pieces of wood together is made of a composite, polymeric material comprising from about 4% to 90% by weight thermosetting resin and from about 10% to 96% by weight fibrous filler material. The thermosetting resin and the fibrous filler material are mixed together and then subjected to a high pressure and an elevated temperature to set the thermosetting resin and form a dense, hard mass of composite, polymeric material which is formed into the cylindrical shape of a dowel. The dowels have a surface that will adhere to conventional glues used in the woodworking industry.

15 Claims, No Drawings

DOWELS MADE FROM THERMOSETTING RESINS AND PROCESS OF MAKING SAME

BACKGROUND OF THE INVENTION

1. Field of the Invention

The present invention relates to dowels used in the woodworking industry to secure two pieces of wood together. In particular, the present invention relates to novel dowels made of a thermosetting resin and a process for making such dowels.

2. State of the Art

In production of cabinets, furniture and other similar items from wood,, adjoining pieces of wood are held securely together with dowels. Almost universally, the dowels have heretofore been made of wood. It has been suggested to make dowels from thermoforming plastic materials, but such dowels have not been commercially acceptable mainly because they are incapable of adhering to the glues used in the woodworking industry. Plastic dowels have heretofore required elaborate surface features that create a frictional engagement with the wood into which the dowels are inserted.

In conventional woodworking practice, receiving cavities are formed in each of the respective pieces of wood that are to be held together. When the pieces of wood are assembled, liquid glue is injected into the dowel receiving cavities. Dowels are then inserted into the cavities and held there by the glue. The gluing of the dowels in the dowel receiving cavities forms a strong bond between the dowel and the piece of wood into which the dowel is received. Dowels made from thermoforming plastic materials will not adhere to the glues used in the woodworking industry, and the bond between the dowel and the piece of wood into which the dowel is inserted must be developed by frictional engagement between the dowel and the cavity that it is inserted into. This frictional engagement does not result in nearly as much bonding strength as obtained with wood dowels that are glued in the cavities. In fact, the bonding strength developed by the frictional engagement of dowels made from thermoforming plastic materials has been so poor that these plastic dowels have not been used commercially to any extent.

OBJECTIVES AND BRIEF DESCRIPTION OF THE INVENTION

A principal objective of the invention is to provide a composite dowel made of a thermosetting resin wherein the dowel made of the thermosetting resin has a surface that will adhere to conventional glues used in the woodworking industry. It is a particular objective of the present invention to provide such a composite dowel that, when glued into a cavity of a piece of wood, will develop a bonding strength comparable to that of a wooden dowel that is glued into an identical cavity in the piece of wood.

The above objectives are achieved in accordance with the present invention by providing a novel dowel that is made of a composite material comprising from about 4% to 90% by weight thermosetting resin and from about 10% to 96% fibrous filler material. The thermosetting resin and the fibrous filler material are mixed together and then subjected to a high pressure and an elevated temperature to set the polymeric material and form a dense, hard mass of material. The hard mass of material is formed into the cylindrical shape of a dowel. Irrespective of whether the hard mass is initially molded into the cylindrical shape of a dowel as it is being formed or whether it is later cut and formed into such a shape, a dowel that is made from the hard mass of thermosetting resin has a surface that will adhere to conventional glues used in the woodworking industry.

Additional objects and features of the invention will become apparent from the following detailed description.

DETAILED DESCRIPTION OF THE PREFERRED EMBODIMENTS

It has been unexpectedly found that a dowel for use in the woodworking industry to secure two pieces of wood together can be made of a composite material made from a thermosetting resin wherein the composite dowel is equivalent or superior in its physical properties to that of common wooden dowels. The composite dowel can be engineered to have superior strength and uniformity properties as compared to dowels made from wood. In addition, the composite dowels have a surface that will adhere as tenaciously to conventional glues used in the woodworking industry as the surface of common dowels made from wood. The composite dowels of the present invention are made of a composite, polymeric material comprising from about 4% to 90% by weight thermosetting resin and from about 10% to 96% by weight fibrous filler material.

The thermosetting resin and the fibrous filler material are mixed together and then subjected to a high pressure and an elevated temperature to set the thermosetting resin and form a dense, hard mass of composite, polymeric material which is formed into the cylindrical shape of the dowel. In a preferred embodiment, the dowel of the present invention comprises from about 6% to 25% by weight thermosetting resin, and most preferably from about 10% to 20% by weight thermosetting resin.

The thermosetting resin is preferably selected from the group consisting of urea formaldehyde, melamine formaldehyde, phenol formaldehyde, polyester, polyurethane and mixtures thereof. The fibrous filler material is preferably selected from the group consisting of sawdust, comminuted paper, comminuted carpet fiber, comminuted textile fiber, comminuted wheat straw, comminuted rice straw, comminuted rice husks, comminuted jute, comminuted hemp, comminuted peanut shells, comminuted coconut husks, comminuted cotton, comminuted bagasse, comminuted corn stalks, comminuted corn husks comminuted hop straw, comminuted oat straw, comminuted barley straw, comminuted pine needles and comminuted lawn grass cuttings.

The dowels of the present invention are made by a novel process comprising making a mixture of from about 4% to 90% by weight thermosetting resin and from about 10% to 96% by weight fibrous filler material. Preferably, from about 6% to 25% by weight resin is used, and, most preferably, from about 10% to 20% by weight resin is used. The mixture is formed into a block, and the block is compressed so that the mixture from which the block is made is subjected to a high pressure. Generally, the pressure must be at least about 200 psi and preferably is from about 500 to 3500 psi or greater.

The material from which the block is made is preferably heated to an elevated temperature simultaneously with the compressing of the block to set the thermosetting resin such that the block becomes a dense, hard mass of material. If a catalyst is added to the mixture just prior to compressing the mixture into the block, the heating of the material can be curtailed or even eliminated. However, if sufficient catalyst is used to eliminate the need for heating of the material, the material must be compressed quickly following the addition of the catalyst to avoid premature setting of the thermosetting resin. Preferably, if a catalyst is used, it is best to follow the procedures recommended by the manufacturers of the catalysts and resins being used. Generally, some heating of the material is advantageous when proper amounts of catalyst are used in accordance with the manufacturer's recommendations.

The material from which the block is made can be shaped as it is being compressed so as to form a block having a shape of a conventional plank or board. It is also possible to mold the block of material while it is being compressed so as to have a cylindrical shape. When a block is formed having the shape of a conventional plank or board, the resulting plank or board must be cut or milled into the cylindrical shape of the dowel. The integrity of the plank or board is such that the cylindrical dowels can be cut or formed using extremely close tolerances whereby the cross-sectional diameter of the resulting dowels does not vary by more that about three mils. When the block is molded and compressed so as to have a cylindrical shape, the block can be cut into pieces having the desired length of the dowels. Again, the molding of the cylindrical block can be controlled so that the tolerances of the dowels can be controlled to extremely close values whereby the cross-sectional diameter of the resulting dowels does not vary by more that about three mils.

The thermosetting resin is preferably selected from the group consisting of urea formaldehyde, melamine formaldehyde, phenol formaldehyde, polyester, polyurethane and mixtures thereof. The fibrous filler material is selected from the group consisting of sawdust, comminuted paper, comminuted carpet fiber, comminuted textile fiber, comminuted wheat straw, comminuted rice straw, comminuted rice husks, comminuted jute, comminuted hemp, comminuted peanut shells, comminuted coconut husks, comminuted cotton, comminuted bagasse, comminuted corn stalks, comminuted corn husks, comminuted hop straw, comminuted oat straw, comminuted barley straw, comminuted pine needles and comminuted lawn grass cuttings. Throughout this disclosure, the term comminuted is meant to encompass ball milling, shredding or cutting the fibrous filler material so that the resulting milled, shredded or cut fibrous material will pass through a screen having a mesh size of from one-eighth to three-eighths inch.

As an example, dowels were made in accordance with the present invention by mixing comminuted, corrugated paper boxing with melamine formaldehyde resin in a ratio of 6.67 parts by weight of comminuted, corrugated paper with one part by weight of resin. The mixture was placed into a press and compressed at a pressure of 3500 psi for 2.5 minutes. The temperature of the mixture in the press was elevated to 150° Centigrade. The resin set while the mixture was being compressed in the press, and a mass of hard, substantially homogeneous material was removed from the press. The mass of hard material was cut into the shapes of dowels.

The dowels as made in the procedure outlined in the preceding paragraph were then tested and compared with plastic dowels that were machined from thermoplastic material such as nylon, polyethylene, polypropylene and polyvinyl chloride. The dowels were inserted into dowel holes formed in the side edge of a piece of particle board. Dowels as made in the procedure of the above paragraph were divided into two sub-groups. The dowels in the first sub-group were inserted into dowel holes with no glue applied to the dowels or in the dowel holes. The dowels of the second sub-group were inserted into dowel holes in which a premeasured amount of glue conventionally used in the woodworking industry for gluing dowels had been injected therein as is conventionally done when gluing a dowel in a dowel hole in the woodworking industry. After allowing the glue to set for a sufficient time, the dowels of both the first and second groups were tested to determine the force needed to pull the dowels longitudinally out of the dowel holes into which the dowels had been inserted. The unglued dowels could be pulled out of their respective dowel holes with a force of between 140 and 180 pounds tensile pull. The dowels that had been glued into their respective dowel holes required a force of between about 520 and 560 pounds tensile pull to be pulled from their respective dowel holes.

Dowels of the identical size as those tested in the procedure set forth in the previous paragraph were made out of polyvinyl chloride, a thermoforming plastic material. These dowels were divided into two sub-groups. The first sub-group was inserted into dowel holes in the same manner as the first sub-group of dowels in the procedure outlined in the preceding paragraph. There was no glue applied to the dowels of this first sub-group, nor was there any glue injected into the dowel holes. The second sub-group was inserted into dowel holes in the same manner as the second sub-group of dowels in the procedure outlined in the preceding paragraph, i.e., a premeasured amount of glue was injected into each dowel hole before a dowel was inserted into the dowel hole. After allowing the glue to set for the same time as in the procedure of the preceding paragraph, the dowels of both the first and second sub-groups were tested to determine the force needed to pull the individual dowels longitudinally out of their respective dowel holes. The unglued dowels of the first sub-group could be pulled out of their respective dowel holes with a force of 120 pounds tensile pull. The glued dowels of the second sub-group could be pulled out of their respective dowel holes with a force of between about 110 and 120 pounds tensile pull.

Although preferred embodiments of the present invention have been described, it is to be understood that the present disclosure is made by way of example and that various other embodiments are possible without departing from the subject matter coming within the scope of the following claims, which subject matter is regarded as the invention.

I claim:

1. A method of making a dowel for use in the woodworking industry to secure two pieces of wood together, wherein said dowel is made from a composite, polymeric material, said method comprising:

mixing from about 4% to 90% by weight thermosetting resin with about 10% to 96% by weight comminuted fibrous filler material to form a mixture;

compressing said mixture with a pressure of at least 3,500 pounds per square inch;

heating said mixture substantially simultaneously with said compressing; and forming said mixture into a shape of the dowel to have a surface that will adhere to a woodworking glue during said compressing.

2. A method of making a dowel in accordance with claim 1 wherein the amount of thermosetting resin is from about 6% to 25% by weight.

3. A method of making a dowel in accordance with claim 1 wherein the amount of thermosetting resin is from about 10% to 20% by weight.

4. A method of making a dowel in accordance with claim 1 wherein said thermosetting resin is selected from the group consisting of urea formaldehyde, melamine formaldehyde, phenol formaldehyde, polyester, polyurethane and mixtures thereof.

5. A method of making a dowel in accordance with claim 1 wherein said fibrous filler material is selected from the group consisting of sawdust, comminuted paper, comminuted carpet fiber, comminuted textile fiber, comminuted wheat straw, comminuted rice straw, comminuted rice husks, comminuted jute, comminuted hemp, comminuted peanut shells , comminuted coconut husks, comminuted cotton, comminuted bagasse, comminuted corn stalks, comminuted corn husks, comminuted hop straw, comminuted oat straw, comminuted barley straw, comminuted pine needles and comminuted lawn grass cuttings.

6. A method of making a dowel in accordance with claim 1 wherein said thermosetting resin is selected from the group consisting of urea formaldehyde, melamine formaldehyde, phenol formaldehyde polyester, polyurethane and mixtures thereof; and said fibrous filler material is selected from the group consisting of sawdust, comminuted paper, comminuted carpet fiber, comminuted textile fiber, comminuted wheat straw, comminuted rice straw, comminuted rice husks, comminuted jute, comminuted hemp, comminuted peanut shells, comminuted coconut husks, comminuted cotton, comminuted bagasse, comminuted corn stalks, comminuted corn husks, comminuted hop straw, comminuted oat straw, comminuted barley straw, comminuted pine needles and comminuted lawn grass cuttings.

7. A method in accordance with claim 1 wherein a cylindrical shape of the dowel is controlled such that a cross-sectional diameter thereof does not vary by more than about three mils.

8. A method of making a dowel for use in the woodworking industry to secure two pieces of wood together, said method comprising:

mixing from about 4% to 90% by weight of a thermosetting resin with about 10% to 96% by weight of a comminuted fibrous filler material to form a mixture;

forming said mixture into an elongate, cylindrical member;

compressing said elongate, cylindrical member at a pressure of at least 3,500 pounds per square inch;

heating said elongate, cylindrical member substantially simultaneously with said compressing to form a dense, hard mass of material having a surface that will adhere to a water-soluble woodworking glue; and cutting said elongate, cylindrical member into at least one dowel having a desired length.

9. A method of making a dowel in accordance with claim 8 wherein the amount of thermosetting resin is from about 6% to 25% by weight.

10. A method of making a dowel in accordance with claim 8 wherein the amount of thermosetting rosin is from about 10% to 20% by weight.

11. A method of making a dowel in accordance with claim 8 wherein said thermosetting resin is selected from the group consisting of urea formaldehyde, melamine formaldehyde, phenol formaldehyde, polyester, polyurethane and mixtures thereof.

12. A method of making a dowel in accordance with claim 8 wherein said fibrous filler material is selected from the group consisting of sawdust, comminuted paper, comminuted carpet fiber, comminuted textile fiber, comminuted wheat straw, comminuted rice straw, comminuted rice husks, comminuted jute, comminuted hemp, comminuted peanut shells, comminuted coconut husks, comminuted cotton, comminuted bagasse, comminuted corn B &talks, comminuted corn husks, comminuted hop straw, comminuted oat straw, comminuted barley straw, comminuted pine needles and comminuted lawn grass cuttings.

13. A method of making a dowel in accordance with claim 8 wherein said thermosetting resin is selected from the group consisting of urea formaldehyde, melamine formaldehyde, phenol formaldehyde, polyester, polyurethane and mixtures thereof; and said fibrous filler material is selected from the group consisting of sawdust, comminuted paper, comminuted carpet fiber, comminuted textile fiber, comminuted wheat straw, comminuted rice straw, comminuted rice husks, comminuted jute, comminuted hemp, comminuted peanut shells, comminuted coconut husks, comminuted cotton, comminuted bagasse, comminuted corn stalks, comminuted corn husks, comminuted hop straw, comminuted oat straw, comminuted barley straw, comminuted pine needles and comminuted lawn grass cuttings.

14. A method of securing at least two components of wood to each other, comprising:

providing a water soluble woodworking glue on a first end of a dowel comprising about 4 to 90% by weight thermoset resin and about 10 to 96% by weight comminuted fibrous filler material;

inserting said first end into a first dowel hole of one of the at least two components;

adhering said first end to said first dowel hole with said water soluble woodworking glue; and inserting a second end of said dowel into a second dowel hole of another of the at least two components.

15. A method of securing a composite dowel to a wood component, comprising:

providing a water soluble woodworking glue on an end of the composite dowel comprising about 4 to 90% by weight thermoset resin and about 10 to 96% by weight comminuted fibrous filler material;

inserting said end into a dowel hole of the wood component; and adhering said end to said dowel hole with said water soluble woodworking glue.

* * * * *

UNITED STATES PATENT AND TRADEMARK OFFICE
CERTIFICATE OF CORRECTION

PATENT NO.     : 6,051,635
DATED          : April 18, 2000
INVENTOR(S)    : J. Mel Hatch Page 1 of 1

It is certified that error appears in the above-identified patent and that said Letters Patent is hereby corrected as shown below:

<u>Title page,</u>
Item [76], Inventor, change "J." to -- J --; and after "Hatch," insert -- Jr., --

<u>Column 3,</u>
Line 25, change "that" to -- than --
Line 40, after "term" change "comminuted" to -- comminuted --

<u>Column 5,</u>
Line 16, insert a comma after "formaldehyde"

<u>Column 6,</u>
Line 11, change "B &talks" to -- stalks --

Signed and Sealed this

Twenty-second Day of April, 2003

JAMES E. ROGAN
*Director of the United States Patent and Trademark Office*